United States Patent
Rebec et al.

[11] Patent Number: 5,991,801
[45] Date of Patent: Nov. 23, 1999

[54] GLOBAL DIGITAL VIDEO NEWS DISTRIBUTION SYSTEM

[75] Inventors: Mohammed S. Rebec; Mihailo V. Rebec, both of Bristol, Ind.

[73] Assignee: Trans Video Electronics, Ltd., Bristol, Ind.

[21] Appl. No.: 08/694,704

[22] Filed: Aug. 9, 1996

Related U.S. Application Data

[60] Division of application No. 08/085,329, Jul. 2, 1993, Pat. No. 5,594,936, which is a continuation-in-part of application No. 08/047,089, Apr. 16, 1993, abandoned.

[51] Int. Cl.[6] .............................. H04N 7/14; H04H 1/02
[52] U.S. Cl. .............................. 709/219; 348/7; 348/12; 348/13; 455/4.2; 455/5.1
[58] Field of Search ............................ 348/6, 7, 8, 12, 348/13; 455/3.1, 3.2, 3.3, 4.1, 4.2, 5.1, 5.2, 6.1, 6.2, 6.3; 375/211, 212, 219, 220, 222, 257; 370/60–62, 69.1, 72, 73, 125, 85.1, 85.7, 85.9, 85.13, 85.14; 379/93, 94

[56] References Cited

U.S. PATENT DOCUMENTS

| | | |
|---|---|---|
| 4,672,655 | 6/1987 | Koch . |
| 4,672,656 | 6/1987 | Pfeiffer et al. . |
| 4,866,787 | 9/1989 | Olesen . |
| 4,979,170 | 12/1990 | Gilhousen et al. . |
| 5,014,125 | 5/1991 | Pocock et al. ............................ 348/13 |
| 5,019,910 | 5/1991 | Filmer . |
| 5,023,934 | 6/1991 | Wheeless . |
| 5,029,232 | 7/1991 | Nall . |
| 5,157,491 | 10/1992 | Kassatly . |
| 5,198,899 | 3/1993 | Cang ............................................ 348/7 |
| 5,239,540 | 8/1993 | Rovira et al. . |
| 5,247,575 | 9/1993 | Sprague et al. ............................ 348/12 |
| 5,249,303 | 9/1993 | Goeken . |
| 5,262,875 | 11/1993 | Mincer et al. . |

Primary Examiner—John W. Miller
Attorney, Agent, or Firm—Fleshner & Kim

[57] ABSTRACT

An information distribution system for a digital network, includes a master communications unit for establishing communications with the network in order to receive a synchronous digital signal, a distribution amplifier unit for receiving and dividing the synchronous digital signal into a plurality of synchronous signals and a plurality of communications units for establishing communications with a plurality of receiving stations. The system also includes a master controller for controlling the plurality of communications units from a central location. The invention alternatively relates to an information disseminating system for a digital network and includes a plurality of video clip storing units, each storing data related to a particular subject matter, a plurality of distribution amplifiers associated with the video clip storing units and a plurality of communications units which establish communications between the plurality of distribution amplifiers and the digital network. A menu storing unit accessible from the digital network, stores information indicating the subject matter associated with each of the plurality of video clip storing units as well as information as to how to access each of the video clip units.

29 Claims, 9 Drawing Sheets

FRONT VIEW
SYNCHRONOUS DISTRIBUTION WHICH AMPLIFIES AND EQUALIZES

GLOBAL DIGITAL VIDEO NEWS DISTRIBUTION SYSTEM

This is a divisional application of Ser. No. 08/085,329 filed on Jul. 2, 1993 that issued as U.S. Pat. No. 5,594,936, which is a continuation-in-part of U.S. patent application Ser. No. 08/047,089, filed on Apr. 16, 1993 abandoned the contents of both are incorporated herein by reference.

BACKGROUND OF THE INVENTION

I. Field of the Invention

This invention relates generally to an apparatus and method for transmitting digital information to locations throughout the world and in particular to a global digital news distribution system for transmitting digital news clips and/or digitized photographs for printing simultaneously from one or more locations anywhere in the world to one or more locations anywhere in the world.

II. Description of the Related Art

FIG. 1A shows how a television station 28 receives a video clip from a remote location and sends that clip to another location for broadcasting. In particular, FIG. 1A shows a satellite earth station 40 with a large C or Ku disk 44 which uplinks C or Ku microwaves to satellite 20. Satellite 20 in turn downlinks these microwave signals to television station 28 where it can be broadcast live to a surrounding area or taped for broadcast at a later time. Alternatively, television station 28 can retransmit the video clip from disk 25 to another television station 29 having its own disk 30.

This process has a variety of drawbacks. First, the news information must be sent from point to point (a serial type of data transfer) rather than from point to multi-point (a parallel type of information transfer). Also, television station 28 can only receive in one direction (the direction in which it is pointed) and can only simultaneously transmit in multiple directions if it has multiple satellite dishes. This process has the further limitation of transmitting and storing video clips in analog form and consequently is not readily compatible with digital land networks such as ACUNET. Also, the current process does not provide on-demand news, but instead news clips must be transmitted on a prearranged basis from satellite earth station 40 to television station 28 and from television station 28 to television station 29.

In addition to the above limitations, the current process does not have a news distribution system which has both digital recording ability. Hence, a television station 29 cannot get its news clips from a hub station and immediately digitally edit those clips. The current process does not provide a digital data base which organizes information so that local television stations can log into a menu which provides a list of particular news clips which are available. The current process does not provide a flexible system which enables a hub station to transmit its video clips at various rates to accommodate various rates of data transfer at various receiving sites. In addition, the process is expensive and local stations cannot selectively choose which news clips they wish to receive.

SUMMARY OF THE INVENTION

It is therefore an object of the invention to provide an information distribution system which can disseminate information from one point to a plurality of receivers in a parallel fashion.

Another object of the invention is to provide a method and apparatus which can simultaneously transmit audio/video information in diametrically opposite directions.

Another object of the invention is to provide a method and apparatus which is readily compatible with digital networks such as ACUNET.

Another object of the invention is to provide on-demand access to audio/video news clips.

One advantage of the invention is that it eliminates the need to prearrange times to transmit from one satellite earth station to a television station or from one television station to another television station.

Another advantage of the invention is that it provides a news distribution system which has both digital recording and scan conversion capabilities so that a local television station can get its news clips from a hub station and selectively edit those clips.

Another advantage of the invention is that it transmits news clips inexpensively.

Another advantage of the invention is that it provides news information organized so that local television stations can log into a menu which provides a list of available news clips and how to acquire those clips.

One feature of the invention is that it provides a hub station which can transmit its video clips at various rates to accommodate various rates of data transfer at various receiving locations.

Another feature of the invention is that local stations can selectively choose which news clips they wish to receive.

Another feature of the invention is that it makes it possible to selectively edit news clips at the local station, if desired.

These and other objects advantages and features are accomplished according to the invention by the provision of an information distribution system for a digital network, which includes: a master communications unit coupled to the digital network for establishing communications with the network in order to receive a synchronous digital signal from the network. The system further includes a distribution amplifier unit coupled to the master communications unit for receiving and dividing the synchronous digital signal into a plurality of synchronous signals. The system also provides for a plurality of communications units coupled to the distribution amplifier unit for establishing communications with a plurality of receiving stations and for receiving and outputting a respective one of the plurality of synchronous signals to the plurality of receiving stations. The system further includes a master controller unit coupled to the plurality of communications units for controlling the plurality of communications units from a central location.

The above objects, advantages and features are even further accomplished by the provision of an input unit in the master controller unit for inputting instructions to control the plurality of communications units.

The above and other objects, advantages and features are further accomplished by the provision of a first back-up memory for receiving and storing at least one asynchronous signal.

The above and other objects, advantages and features are further accomplished by the provision of an equalizing unit for equalizing respective amplitudes of the plurality of synchronous signals.

These and other objects, advantages and features are accomplished by the provision of an information disseminating system for a digital network, including: a plurality of video clip storing units for storing data, each of the plurality of video clip storing units storing data related to a particular subject matter; a plurality of distribution amplifier units each having an input for receiving data from a respective one of the plurality of video clip storing units and each having at least one output, for dividing the data stored in each of the plurality of video clip storing units. The system further includes a plurality of communications units at least one of which is coupled to a respective one of the plurality of distribution amplifiers, wherein the plurality of communications units establish communications between the plurality of distribution amplifier units and the digital network. The system further includes a menu storing unit accessible from the digital network, for storing information indicating the subject matter associated with each of the plurality of video clip storing units as well as information as to how to access each of the video clip storing units.

These and other objects advantages and features are further accomplished by the provision of a method for distributing information to various locations in a digital network, including the steps of: establishing communications with the network in order to receive a synchronous digital signal from the network; receiving and dividing the synchronous digital signal into a plurality of synchronous signals; establishing communications with a plurality of receiving stations; receiving and outputting a respective one of the plurality of synchronous signals to a respective receiving station; and controlling the receiving and outputting step with a controller unit at a central location.

Further features and advantages will become apparent from the following description of the preferred embodiments taken with the drawings.

DETAILED DESCRIPTION OF PREFERRED EMBODIMENTS

Figure 1A:
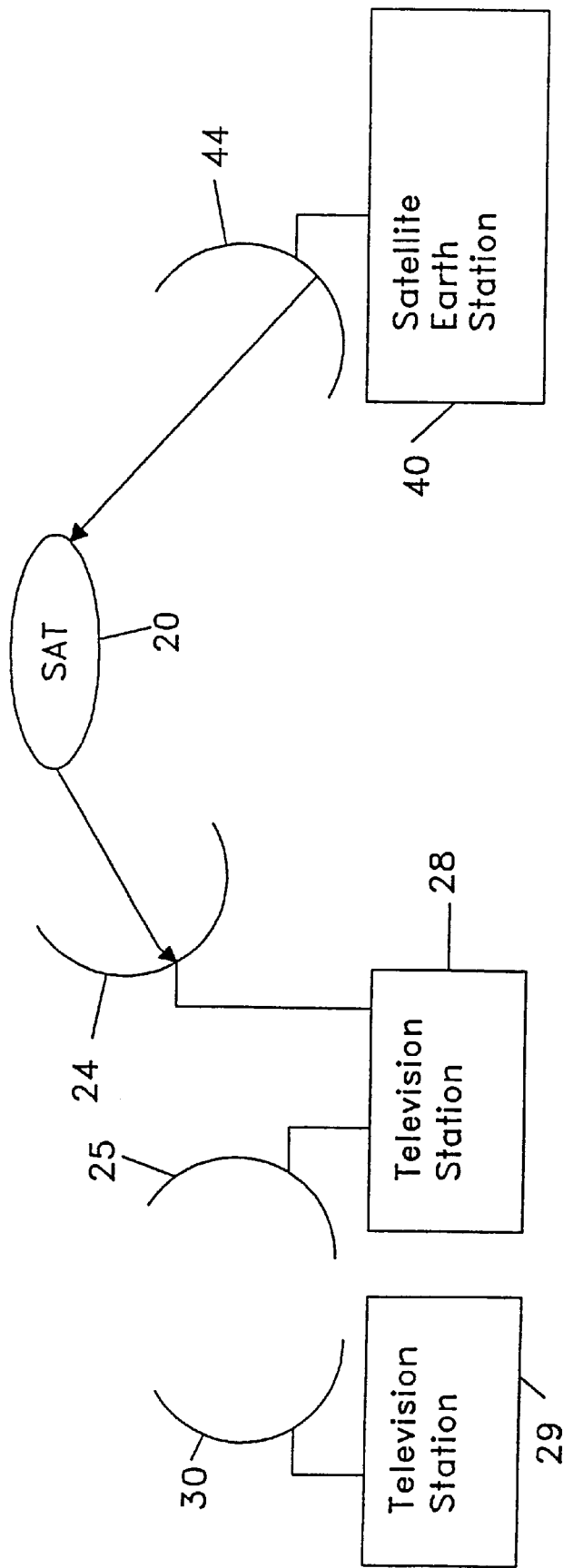
FIG. 1A shows how a television station receives a video clip from a remote location and sends that clip to another location for broadcasting.
Figure 1B:
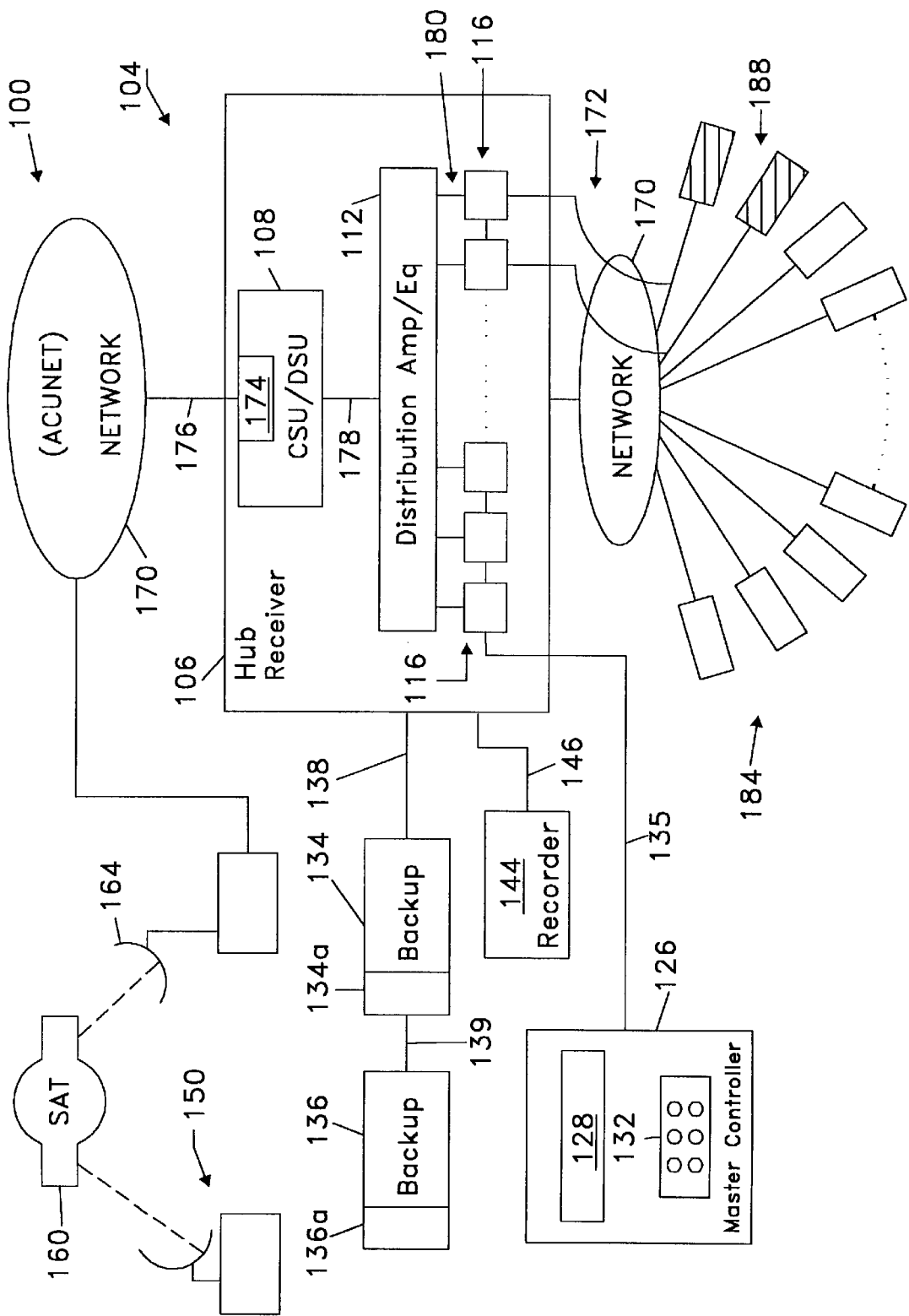
FIG. 1B shows a digital information distribution system according to one embodiment of the invention.

FIG. 1B shows a digital network 100 having a digital information distribution system 104 according to one embodiment of the invention. Digital information distribution system 104 includes a hub receiver 106 having a master CSU/DSU 108, a distribution amplifier/equalizer 112 and a plurality of CSU/DSUs 116. CSU/DSUs are communications units which perform hand-shaking functions to initiate communications between synchronous digital equipment. One example of a CSU/DSU unit is CSU/DSU model 1056S from Integrated Network Corporation (I.N.C.). Digital information distribution system 104 further includes a master controller 126 having a master controller display 128 and a master controller keypad 132. Master controller 126 is connected to the plurality of Customer Service Units/Data Service Units CSU/DSUs 116 via one or more RS-232 lines 135. Digital information distribution system 104 also includes a first backup unit 134 having a first backup hard disk 134a and a second backup unit 136 having a second backup hard disk 136a. Backup unit 134 is connected to hub receiver 106 via RS-232 line 138. Second backup unit 136 is connected to first backup unit 134 via RS-232 line 139. Digital information distribution system 104 also has a recorder 144 connected to hub receiver 106 via RS-232 lines 146.

Digital information distribution system 104 operates as follows. A suitcase transmission unit 150, such as the suitcase unit described in U.S. Patent application Ser. No. 08/047,089, gathers a video clip, compresses that clip and then transmits or uplinks that clip to a satellite system 160 which may include one or more satellites and one or more earth stations. Satellite system 160 eventually downlinks the compressed video news clip to an earth station 164 which is coupled to a land network 170 such as ACUNET. Land network 170 can include microwave links, hard wire links and optical fiber links. Land network 170 is a synchronous digital system and consequently is coupled to hub receiver 106, and in particular to master Customer Service Unit/Data Service Unit CSU/DSU 108 via a V.35 pin input 174 which receives lines 176. Synchronous (V.35) line 178 interconnects master CSU/DSU 108 to distribution amplifier/equalizer 112.

Digital network 100 transmits digital information corresponding to a news clip from a camera (not shown) which can serve as a news clip for television and other audio/video media. Alternatively, the digital information can serve as a series of still photographs for printed media.

Figure 1C:
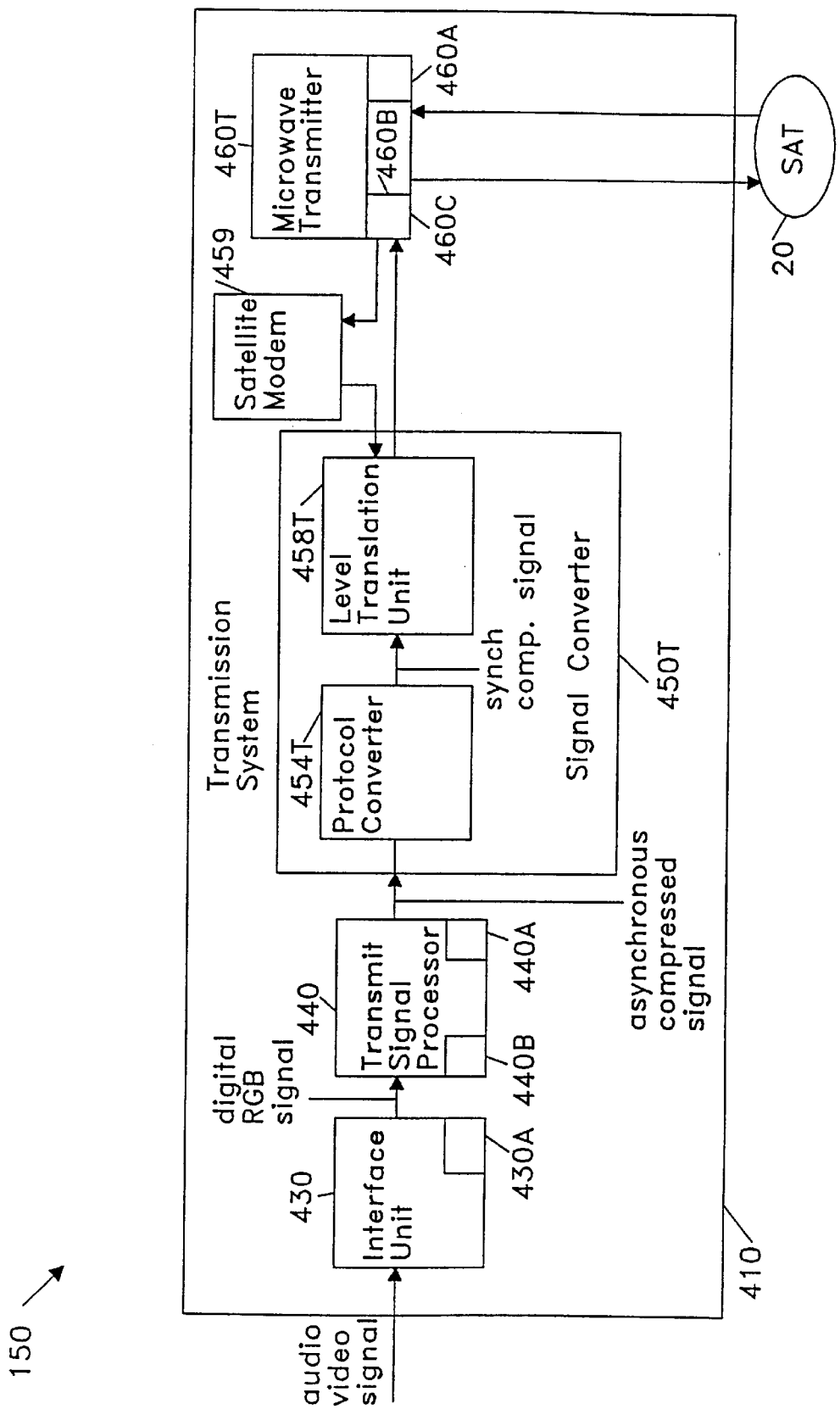
FIG. 1C shows a transmission system which can be used to transmit video clips from remote locations and FIG. 1D shows backup units which include a signal converter and a receive signal processor.

FIG. 1C shows a transmission system 410 which can be used to transmit video clips from remote locations. Transmission system 410 includes an interface unit 430 which receives an analog audio/video signal from a camera (not shown) and transforms that analog audio/video signal into a digital red, green, blue (RGB) signal. Interface unit 430 demodulates the audio/video signal which can be a NTSC, PAL, or SECAM signal and outputs the digital RGB signal. The digital RGB signal is received by a transmit signal processor 440 which compresses the digital RGB signal into an asynchronous compressed signal and stores that asynchronous compressed signal on a hard disk 440A. Transmit signal processor 440 can then output the asynchronous compressed signal which, in turn, is received by a signal converter 450T.

Signal converter 450T includes a protocol converter 454T and a level translation unit 458T. Protocol converter 454T receives the asynchronous compressed signal and converts that signal to a synchronous compressed signal. The synchronous compressed signal is then input to level translation unit 458T which translates it into a level translated synchronous compressed signal ready to be received by a microwave transmitter (not shown) which is part of digital network 100.

Returning to FIG. 1B, hub receiver 104 distributes digital information such as a compressed video news clip or a series of still pictures as follows. The compressed video news clip is input to master CSU/DSU 108 via line 176 which receives a synchronous digital data stream and performs handshaking functions. These handshaking functions initiate communications between network 170 and distribution amplifier equalizer 112. Master CSU/DSU 108 then outputs the synchronous digital signal which is received by distribution amplifier/equalizer 112. Distribution amplifier/equalizer 112 then splits up the resulting synchronous signal and outputs a plurality of synchronous signals to each of the plurality of CSU/DSUs 116 via output lines 180. Each of the plurality of CSU/DSUs 116 is coupled into land network 170 via lines 172 which in turn are coupled to receiving stations 184. Alternatively, if no digital network (e.g., ACUNET) is available, remote suitcases 188 can be used as receiving stations as described in U.S. patent application Ser. No. 08/047,089.

Figure 1D:
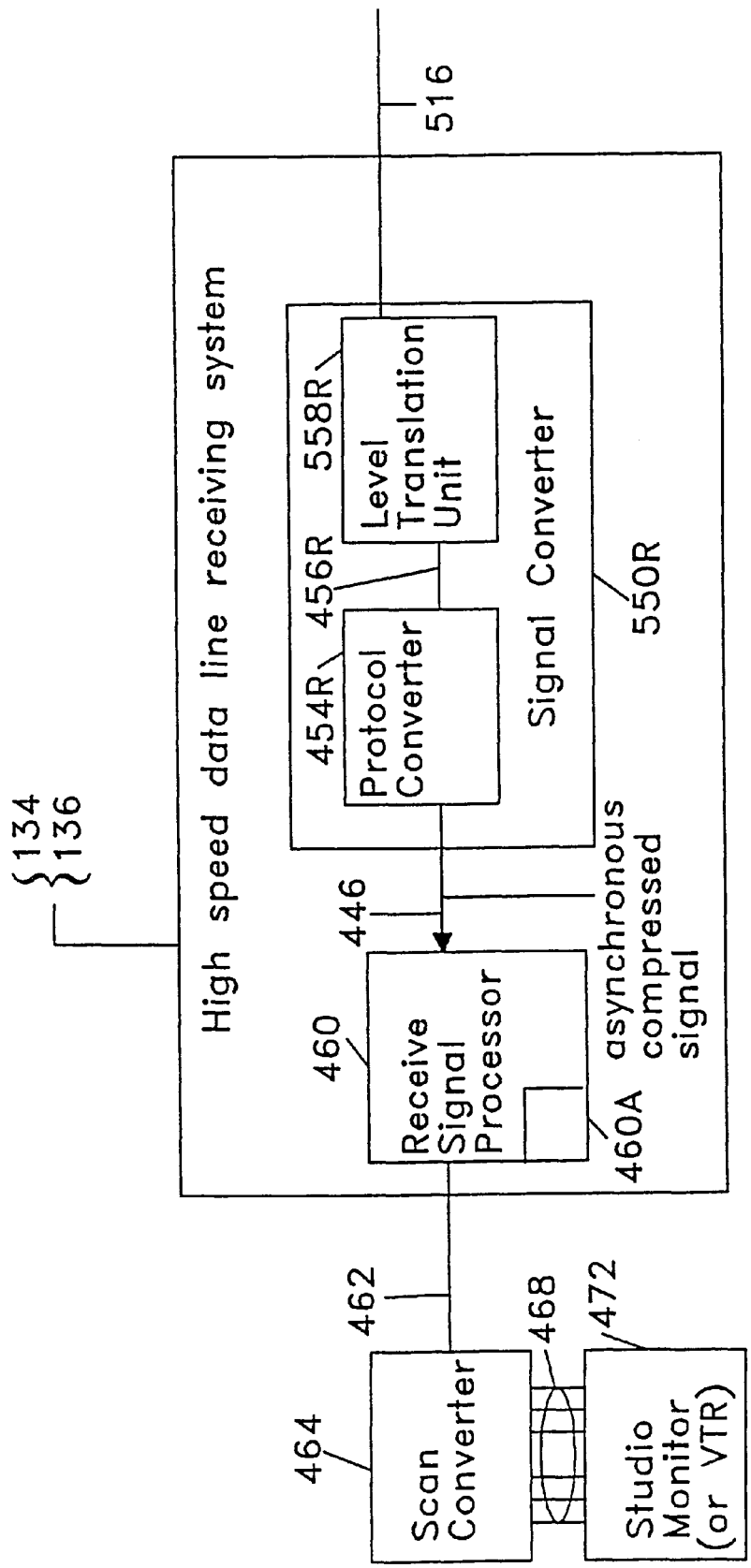

First and second backup units 134 and 136 function as a digital receiving system similar to digital receiving system 510 in U.S. patent application Ser. No. 047,089. In particular, referring to FIG. 1D, backup units 134 and 136 include a signal converter 550R followed by a receive signal processor 460. Signal converter 550R includes level translation unit 558R followed by protocol converter 454R. A high speed digital (HSD) signal is received on line 516 by signal converter 550R. Level translation unit 558R in turn translates the voltage level of that high speed digital signal for transmission on serial line 456R as a synchronous compressed signal. Protocol converter 454R then receives and transforms this synchronous compressed signal into an asynchronous, compressed signal for transmission on a bus 446 to receive signal processor 460. Receive signal processor 460 decompresses this asynchronous, compressed signal and stores a resulting asynchronous, compressed signal on a hard disk 460A. If the decompression of the asynchronous compressed signal received by signal processor 480 is the inverse of the compression which the digital clip underwent at transmission unit 150, receive signal processor 460 outputs a digital signal corresponding to the news clip output from the camera at unit 150.

Figure 2:
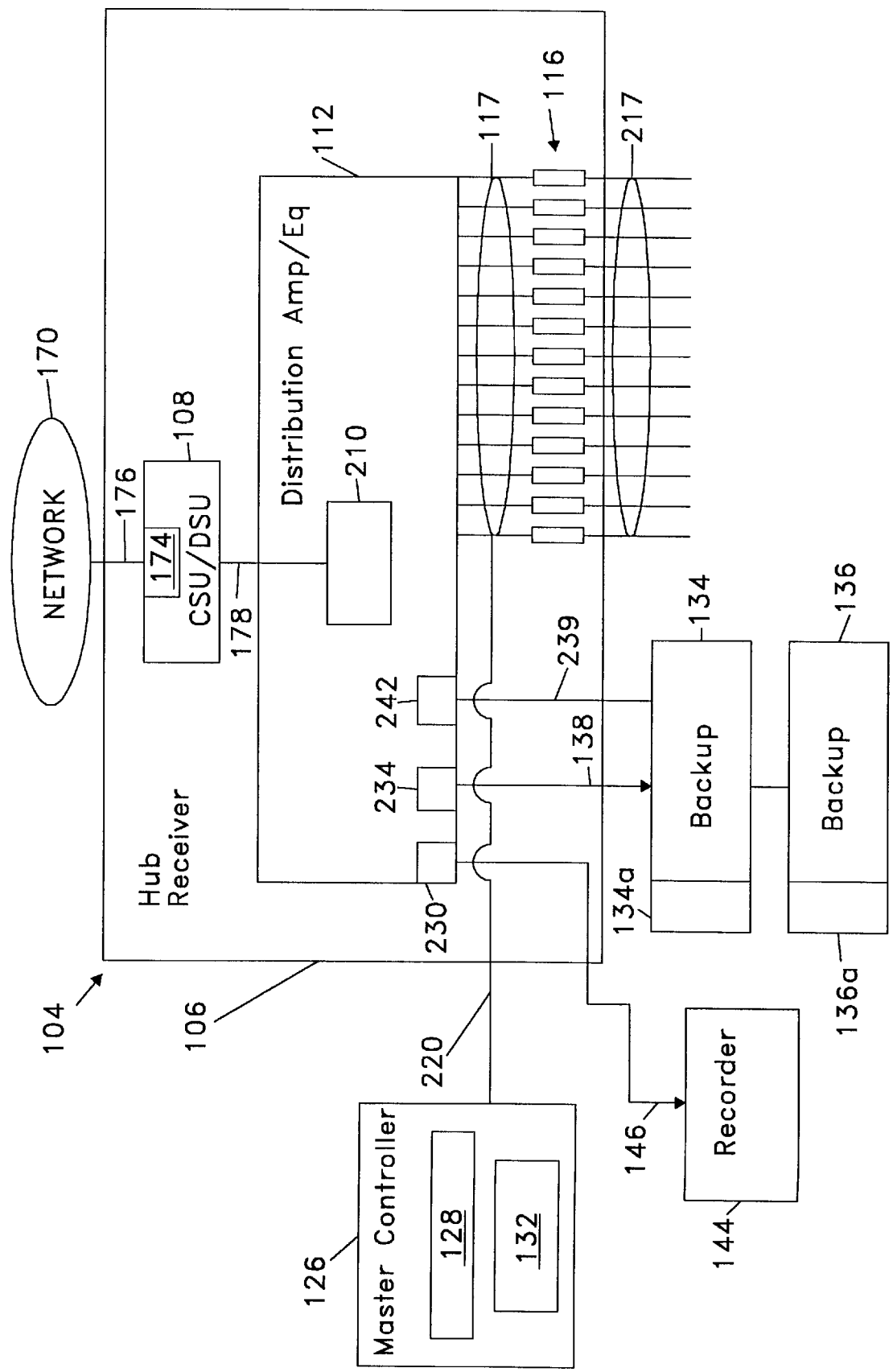
FIG. 2 shows the digital information distribution system in more detail.

FIG. 2 shows digital information distribution system 104 in somewhat more detail. Again, land network 170 is coupled to master CSU/DSU 108 via line 176. V.35 input 174 is coupled to master CSU/DSU 108 via synchronous line 178. V.35 input 174 is in turn coupled to a synchronous-to-asynchronous converter 210 (such as converter 450T in FIG. 1C and in U.S. patent application Ser. No. 08/047,089) in distribution amplifier/equalizer 112. Distribution amplifier/equalizer 112 further includes outputs 230 and 234 connected to recorder 144 and backup unit 134 via RS-232 lines 146 and 138, respectively. Distribution amplifier/equalizer 112 also has an input 242 for receiving the backup signal from backup unit 134 or backup unit 136. The plurality of CSU/DSUs 116 have respective output cables 217 which are coupled to receiving stations 184 of FIG. 1B.

Master controller 126 is coupled to the plurality of CSU/DSUs 116 via RS-232 line 220. RS-232 line 220 can be a bundle of individual RS-232 lines, wherein each line is connected to a different CSU/DSU, or each of the plurality of CSU/DSUs 116 can have a unique address, in which case line 220 can be a single RS-232 line. Distribution amplifier/equalizer 112 also has an input 242 for receiving a backup signal via RS-232 line 239 from backup unit 134 or backup unit 136. This backup signal is received by backup unit 134 or backup unit 136 at the same time it is transmitted out of distribution amplifier/equalizer 112 to CSU/DSUs 116.

Master controller 126 sends commands to the plurality of CSU/DSUs on RS-232 line 220. These commands can be entered using master controller keypad 132. The plurality of CSU/DSUs 116 can send commands to master controller 126 indicating which, if any, CSU/DSU in the plurality of CSU/DSUs 116, did not receive the news clip, or received a news clip with more than a predetermined number of errors.

Figure 3A:
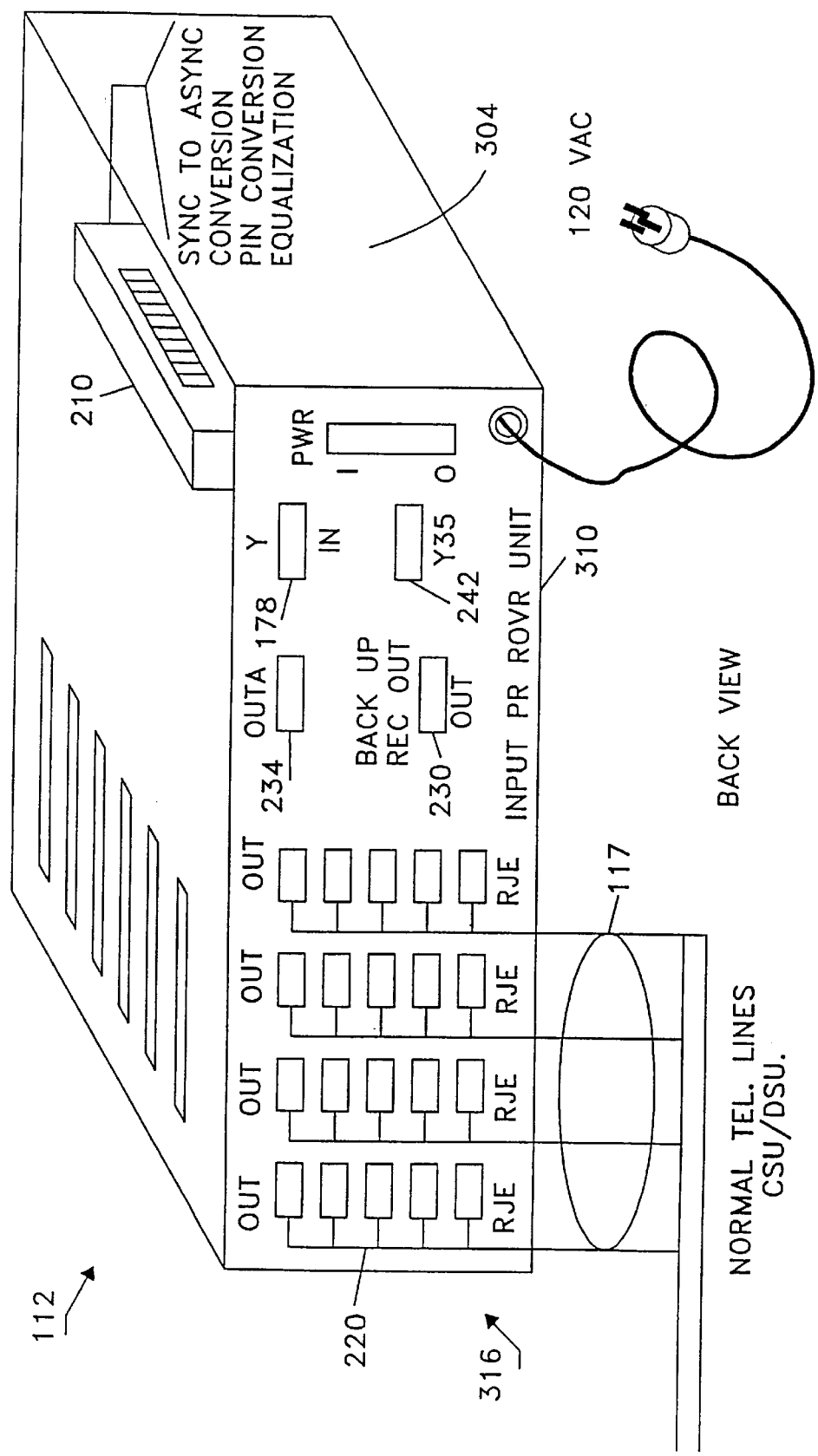
FIGS. 3A and 3B show a rear and a front view, respectively, of a distribution amplifier/equalizer in the digital information distribution system.
Figure 3B:
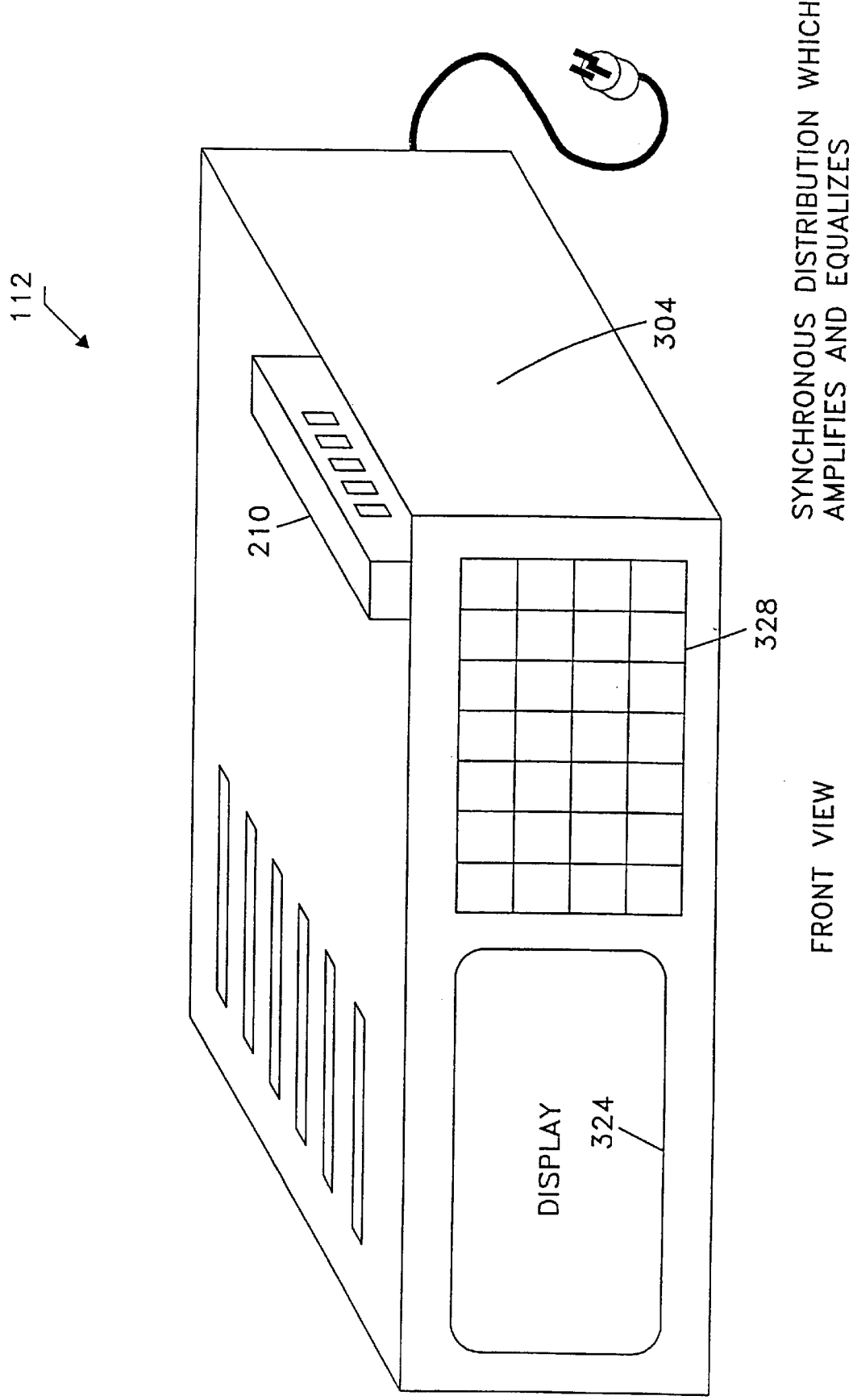

FIGS. 3A and 3B show a rear and a front view, respectively, of distribution amplifier/equalizer 112. Distribution amplifier/equalizer 112 has a housing 304 with a rear panel 310 and a plurality of outputs 316 coupled to the plurality of CSU/DSUs 116 via lines 117. FIG. 3B shows that distribution amplifier/equalizer 112 has a display 324 and a keypad 328 for manually controlling which particular lines 117 and consequently which particular CSU/DSU of the plurality of CSU/DSUs 116 are activated.

Figure 4:
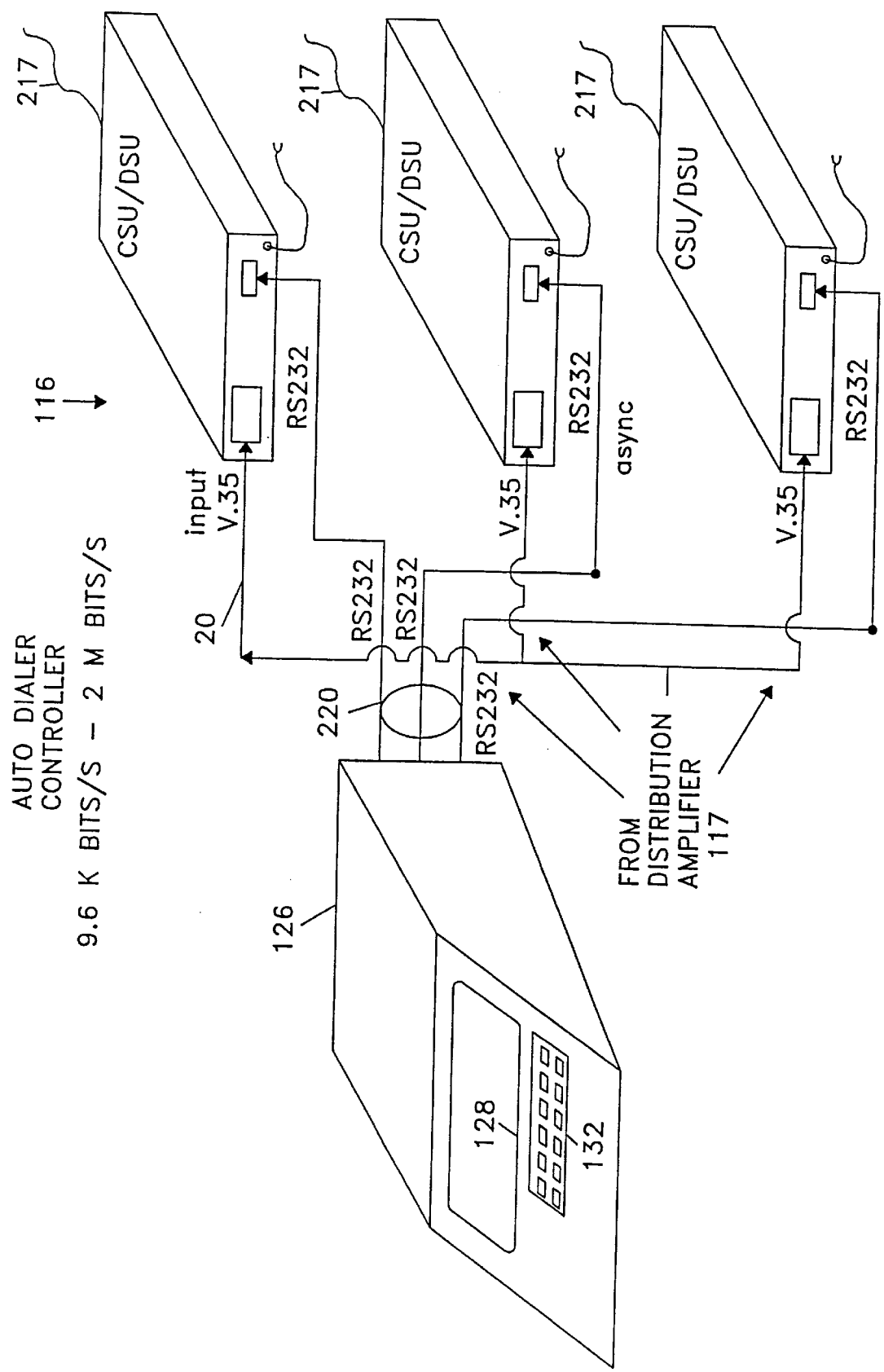
FIG. 4 shows a master controller connected to a plurality of CSU/DSUs in the distribution system.

FIG. 4 shows master controller 126 connected to the plurality of CSU/DSUs 116 via RS-232 lines 220. Here, a separate RS-232 line is connected to a respective CSU/DSU. However, as discussed above, a single RS-232 line can be connected to the plurality of CSU/DSUs 116, if CSU/DSUs 116 are separately addressable. Again, an operator sends commands to the CSU/DSU 116 by entering commands into master controller 126 using keypad 132 and then master controller 126 in turn sends these commands along the appropriate RS-232 line 220. Also, a particular CSU/DSU 116 can send information back to master controller 126 along the appropriate RS-232 line 220. The plurality of CSU/DSUs 116 can have transmission rates varying from 9.6 kilobytes/s (corresponding to normal telephone line rates) up to 2 Megabytes/s (corresponding to special high speed data line rates). It should be understood, however, that hub receiver 106 can couple to very low rate telephone lines such as telephone lines having rates of 2.4 kilobytes/s presently found in some undeveloped countries. Also, the plurality of CSU/DSUs 116 can be connected in parallel. Consequently, multiples of such 9.6 kilobyte can be multiplexed to yield a "virtual" 54 kilobyte line or a virtual 64 kilobyte line.

Figure 5:
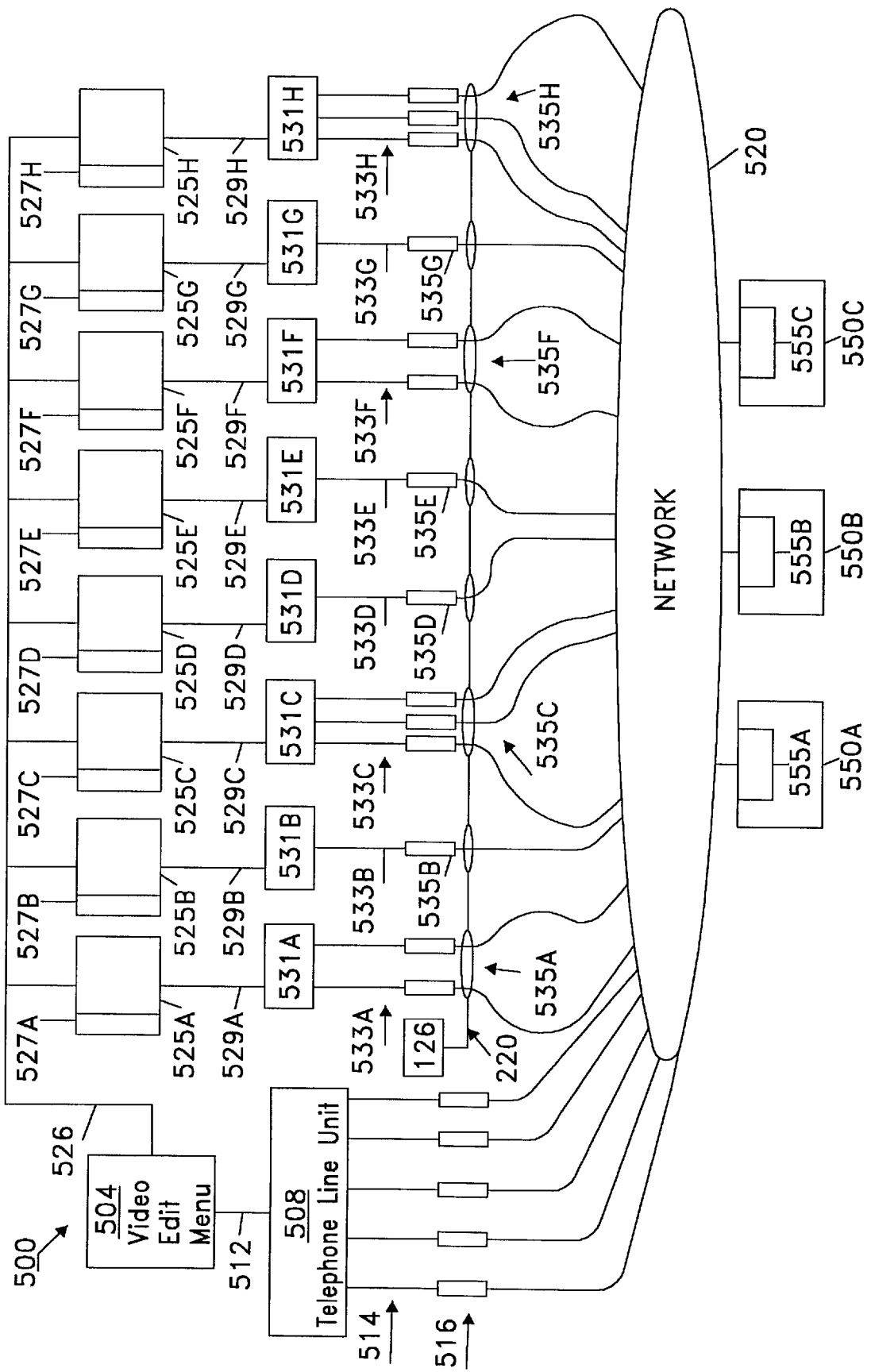
FIG. 5 shows an on-demand video news distribution system according to another embodiment of the invention.

FIG. 5 shows an on-demand video news distribution system 500 according to another embodiment of the invention. System 500 includes a video menu unit 504 coupled to a telephone line unit 508 (corresponding to distribution amplifier-equalizer 112 in FIGS. 1B and 2) via line 512. Telephone line unit 508 has a plurality of output lines 514 which in turn are coupled to a plurality of menu CSU/DSU units 516. This plurality of menu CSU/DSU units are in turn coupled to network 520 (corresponding to land unit 170 of FIG. 1B) via menu lines 524.

Video news distribution system 500 includes a plurality of units 525A–525H similar to backup units 134 or 136 of FIG. 1B interconnected via bus 526. Each unit 525A–525H corresponds to a different news topic or subject matter. For example, unit 525A could correspond to current affairs in Japan, unit 525B could correspond to events in Germany, unit 525C could involve information regarding international financing, and unit 525D could be sports information. Each of the plurality of units 525A–525H includes a respective memory 527A–527H such as a hard disk in which digital information can be stored. The plurality of video clip storing units 525A–525H are coupled to distribution amplifier/equalizers 531A–531H via synchronous lines 529A–529H, respectively. Distribution amplifier/equalizers 531A–531H are identical to distribution amplifier/equalizer 112 previously discussed. Each of distribution amplifier/equalizers 531A–531H like distribution amplifier/equalizer 112 of FIG. 1B and FIG. 2, has multi-line outputs 533A–533H which are respectively coupled to CSU/DSU units 535A–535H. For example, distribution amplifier 531A has three multi-line outputs 533A coupled to CSU/DSU units 535A. Similarly, CSU/DSU units 535A–535H correspond to the plurality of CSU/DSUs 116 of FIG. 1B. CSU/DSU units 535A–535H are all coupled to network 520 in the manner discussed above with reference to FIG. 1B.

Video news distribution system 500 operates as follows. Users at television stations or at newspaper or magazine printing houses 550A–550C dual the telephone number of video menu unit 504 using computers 555A–555C (such as a personal computer with a modem), respectively, which establish communications with menu unit 504. A connected user can then view a menu listing the various clips and/or still photographs available on units 525A–525H. If the user wishes to obtain a particular clip, he or she simply enters a command to menu unit 504 which in turn sends a "request-to-send" command to the appropriate video storing unit 525A–525H. The video storing unit with that video clip or photograph then sends the video clip (photograph) via its corresponding distribution amplifier/equalizers 531A–531H via one of the corresponding CSU/DSU units 535A–535H. For example, if a user of computer 555A wants to receive a news clip on Japan which is stored in unit 525A, the user sends a command to menu unit 504 via one of the menu CSU/DSUs 516 and menu amplifier/equalizer 508. Menu unit 504 then sends a command to unit 527A via bus 526, to send that particular clip to computer 555A via amplifier/equalizer 531A. If a second user at station 550B is currently acquiring that or a different clip from unit 525A and consequently is using one of the CSU/DSUs 535A, unit 525A uses the CSU/DSU 535A which is not being used.

Numerous additional modification and variations of the present invention are possible in light of the above teachings. It is therefore to be understood that within the scope of the appended claims, the invention may be practiced otherwise as specifically claimed.

What is claimed is:

1. An information distribution system for a digital network, comprising:

a plurality of video clip storing means for storing data, each of said plurality of video clip storing means storing video data related to a particular subject matter, wherein said video data includes video and audio signals;

a plurality of distribution amplifier means each having an input which receives video data from and stores video data to a respective one of said plurality of video clip storing means and each having at least one output for dividing said video data stored in each of said plurality of video clip storing means;

a plurality of groups of at least one communications means, each of said groups being respectively coupled to one of said plurality of distribution amplifier means, for establishing communications between said plurality of distribution amplifier means and the digital network; and menu storing means accessible from the digital network for storing information indicating the subject matter associated with each of said plurality of video clip storing means as well as information as to how to access each of said video clip storing means.

2. An information distribution system for a digital network, comprising:

a plurality of video clip storing means for storing data, each of said plurality of video clip storing means storing data related to a particular subject matter;

a plurality of distribution amplifier means each having an input which receives data from a respective one of said plurality of video clip storing means and each having at least one output for dividing said data stored in each of said plurality of video clip storing means;

a plurality of groups of at least one communications means, each of said groups being respectively coupled to one of said plurality of distribution amplifier means, for establishing communications between respective ones of said plurality of distribution amplifier means and the digital network; and menu storing means for storing and communicating information indicating the subject matter associated with each of said plurality of video clip storing means as well as information as to how to access each of said video clip storing means, wherein the menu storing means comprises, menu storing unit coupled to said plurality of video clip storing means, for storing said information, a master distribution amplifier unit coupled to said menu storing unit for dividing said information, and a plurality of master communication units coupled to said master distribution amplifier for coupling said master distribution amplifier unit to the digital network to make said information accessible from the digital network.

3. An information distribution system for a network, comprising:

a plurality of video clip storage units that each store data related to a particular subject matter;

a master communications unit coupled to the digital network that establishes communications with the network in order to receive a synchronous digital signal corresponding to the data related to said particular subject matter stored in a respective one of said plurality of video clip storage units;

a plurality of distribution amplifier units coupled to said master communications unit, wherein each of the plurality of distribution amplifier units has an input that receives said synchronous digital signal corresponding to the data from a respective one of said plurality of video clip storage units and at least one output that divides said synchronous digital signal corresponding to the data from said respective one of said plurality of video clip units into a plurality of synchronous signals;

a plurality of communications units, each of said communications units being coupled to one of said plurality of distribution amplifier units to respectively establish communications between respective ones of said plurality of distribution amplifier units and a plurality of receiving stations in the digital network to receive and output corresponding ones of said plurality of synchronous signals to the plurality of receiving stations;

a master controller unit coupled to said plurality of communications units to control said plurality of communications units from a central location; and a menu storing unit accessible from the digital network that stores information indicating the subject matter associated with each of said plurality of video clip storage units and information as to how to access each of said video clip storage units.

4. An information distribution system for digital network, comprising:

a plurality of digital storing units for storing data, wherein said video data includes video and audio signals;

a plurality of distribution amplifiers each having an input that receives respective data from a respective one of said plurality of digital storing units and each having at least one output for outputting the respective data;

a plurality of groups of at least one communications unit, each of said plurality of groups being respectively coupled to one of said plurality of distribution amplifier units to establish parallel separate connections for multiple direct communications between said plurality of distribution amplifier units and the digital network; and a menu storing unit accessible from the digital network for storing information indicating the type of data associated with each of said plurality of digital storing units.

5. The information distribution system for a digital network as claimed in claim 4, wherein said menu storing unit comprises a plurality of inputs which provide simultaneous access of said information indicating the type of data for multiple users of the network.

6. The information distribution system for a digital network as claimed in claim 4, wherein said menu storing unit stores information indicating how to access each of said plurality of digital storing units.

7. The information distribution system for a digital network as claimed in claim 4, wherein each of said plurality of digital storing units stores audio/video clips relating to a particular subject matter.

8. The information distribution system as claimed in claim 4, wherein each of said plurality of digital storing units store audio information relating to a particular subject matter.

9. The information distribution system as claimed in claim 4, further comprising:
   a telephone line unit coupled to said menu storing unit; and
   at least one menu communications unit coupled to the digital network and said telephone line unit, such that the information indicating the type of data associated with each of said plurality of digital storing units is accessible from the digital network via said at least one menu communications unit and said telephone line unit.

10. An information distribution system for a network, comprising:
    a plurality of digital storing units that store data;
    a plurality of groups of at least one communications unit, each receiving respective data from a respective one of said plurality of digital storing units, said plurality of groups of at least one communications unit establish a parallel separate connection for multiple direct communications between said plurality of digital storing units and the network; and
    a menu storing unit accessible from the network that stores information indicating the type of data associated with each of said plurality of digital storing units.

11. The information distribution system as claimed in claim 10, further comprising a plurality of distribution amplifiers each having an input which receives said respective data from a respective one of said plurality of digital storing units and each having at least one output for outputting the respective data to a respective one of said plurality of groups of communications units.

12. The information distribution system as claimed in claim 10, further comprising:
    a telephone line unit coupled to said menu storing unit; and at least one menu communications unit coupled to the digital network and said telephone line unit, such that the information indicating the type of data associated with each of said plurality of digital storing units is accessible from the digital network via said at last one menu communications unit and said telephone line unit.

13. The information distribution system as claimed in claim 12, wherein said respective data stored in said plurality of storing units includes video clips.

14. The information distribution system as claimed in claim 13, wherein said data is respectively stored in said plurality of storing units according to subject matter.

15. The information distribution system of claim 10, further comprising a controller unit coupled to the plurality of groups of at least one communications unit that controls the plurality of groups of at least one communications unit from a central location.

16. The information distribution system of claim 10 further comprising at least two remote users that request data from a selected one of the plurality of digital storage units, wherein the requested data is transmitted at substantially identical times to each of the at least two remote users.

17. The information distribution system of claim 16, wherein the transmitted information is on-demand and not time divided.

18. The information distribution system of claim 16, wherein the remote users are satellite suitcase units.

19. The information distribution system of claim 10, wherein said plurality of groups of at least one communication unit transmit the respective data to the respective one of the plurality of digital storing units.

20. An information distribution system for a network, comprising:
    a storing unit that stores data;
    at least one communications unit that receives and transmits said data from said storing unit, wherein each of said at least one communications unit establishes a parallel separate connection that permit multiple direct communications between said storing unit and the network, wherein each connection uses a single transmission path to transmit and receive audio and video data; and
    a menu storing unit accessible from the network that stores information indicating the type of data in said storing unit.

21. The information distribution system as claimed in claim 20, further comprising a distribution amplifier having an input which receives said data from said storing unit, said storing unit having at least one output for outputting said information to a respective one of said at least one communications unit.

22. The information distribution system, as claimed in claim 20, wherein said menu storing unit stores information indicating the type of data stored in said storing unit.

23. The information distribution system as claimed in claim 20, further comprising:
    a telephone line coupled to said menu storing unit; and at least one menu communications unit coupled to the network and said telephone line unit, such that said information indicating the type of data associated with said at least one storing unit is accessible from the network via said at least one menu communications unit and said telephone line unit.

24. The information distribution system as claimed in claim 20, further comprising additional storing units, wherein each of said additional storing units as well as said storing unit store respectively data associated with respective subject matter.

25. The information distribution system as claimed in claim 24, further comprising:
    a telephone line unit coupled to said menu storing unit; and at least one menu communications unit coupled to the network and said telephone line unit, such that said information indicating the type of data associated with said storing unit and said additional storing units are accessible from the network via said at least one menu communications unit and said telephone line unit.

26. The information distribution system as claimed in claim 25, further comprising: a plurality of groups of communications units including said at least one communications unit, respectively coupled to said storing unit and said additional storing units, said plurality of groups of communications units being coupled to the network.

27. The information distribution system as claimed in claim 26, wherein said respective data stored in said storing unit and in said additional storing units includes video data.

28. The information distribution system as claimed in claim 26, wherein said respectively data stored in said storing unit and in said additional storing units includes video news clips.

29. The information distribution system as claimed in claim 26, wherein said respective data stored in said storing unit and in said additional storing units, respectively corresponds to geographical regions on earth.

* * * * *

UNITED STATES PATENT AND TRADEMARK OFFICE
CERTIFICATE OF CORRECTION

| | | |
|---|---|---|
| PATENT NO. | : 5,991,801 C1 | Page 1 of 1 |
| APPLICATION NO. | : 90/010774 | |
| DATED | : April 5, 2011 | |
| INVENTOR(S) | : Rebec et al. | |

It is certified that error appears in the above-identified patent and that said Letters Patent is hereby corrected as shown below:

On the Title Page:

Item [57], This statement should be deleted —
"At the time of issuance and publication of this certificate, the patent remains subject to pending reexamination control number 90/010,862 filed Feb. 12, 2010. The claim content of the patent may be subsequently revised if a reexamination certificate issues from the reexamination proceeding."

Signed and Sealed this
Twenty-sixth Day of April, 2011

David J. Kappos
*Director of the United States Patent and Trademark Office*

(12) EX PARTE REEXAMINATION CERTIFICATE (8145th)
United States Patent
Rebec et al.

(10) Number: US 5,991,801 C1
(45) Certificate Issued: Apr. 5, 2011

(54) GLOBAL DIGITAL VIDEO NEWS DISTRIBUTION SYSTEM

(75) Inventors: Mohammed S. Rebec, Bristol, IN (US); Mihailo V. Rebec, Bristol, IN (US)

(73) Assignee: Trans Video Electronics, Ltd., Bristol, IN (US)

Reexamination Request:
No. 90/010,774, Mar. 3, 2010

Reexamination Certificate for:
Patent No.: 5,991,801
Issued: Nov. 23, 1999
Appl. No.: 08/694,704
Filed: Aug. 9, 1996

Related U.S. Application Data

(60) Division of application No. 08/085,329, filed on Jul. 2, 1993, now Pat. No. 5,594,936, which is a continuation-in-part of application No. 08/047,089, filed on Apr. 16, 1993, now abandoned.

(51) Int. Cl.
H04B 7/185 (2006.01)
H04N 7/14 (2006.01)
H04N 7/16 (2006.01)
H04N 7/15 (2006.01)
H04N 7/20 (2006.01)

(52) U.S. Cl. ............. 725/116; 348/E7.063; 348/E7.081; 348/E7.083; 348/E7.093; 725/114; 725/117; 725/119

(58) Field of Classification Search .................... 709/219
See application file for complete search history.

(56) References Cited

U.S. PATENT DOCUMENTS 3,773,979 A 11/1973 Kirk, Jr. et al. ......... 179/15 FD (Continued)

FOREIGN PATENT DOCUMENTS
WO WO 93/11617 A1 6/1993

OTHER PUBLICATIONS

Amin–Salehi, Bahman and Kerner, Martin; "Network Architectures for Digital Video Delivery Service in Mid–1990s"; IEEE; Jun. 1992; pp. 1758–1762.

(Continued)

*Primary Examiner* — Eric B Kiss

(57) ABSTRACT

An information distribution system for a digital network, includes a master communications unit for establishing communications with the network in order to receive a synchronous digital signal, a distribution amplifier unit for receiving and dividing the synchronous digital signal into a plurality of synchronous signals and a plurality of communications units for establishing communications with a plurality of receiving stations. The system also includes a master controller for controlling the plurality of communications units from a central location. The invention alternatively relates to an information disseminating system for a digital network and includes a plurality of video clip storing units, each storing data related to a particular subject matter, a plurality of distribution amplifiers associated with the video clip storing units and a plurality of communucations units which establish communications between the plurality of distribution amplifiers and the digital network. A menu storing unit accessible from the digital network, stores information indicating the subject matter associated with each of the plurality of video clip storing units as well as information as to how to access each of the video clip units.

At the time of issuance and publication of this certificate, the patent remains subject to pending reexamination control number 90/010,862 filed Feb. 12, 2010. The claim content of the patent may be subsequently revised if a reexamination certificate issues from the reexamination proceeding.

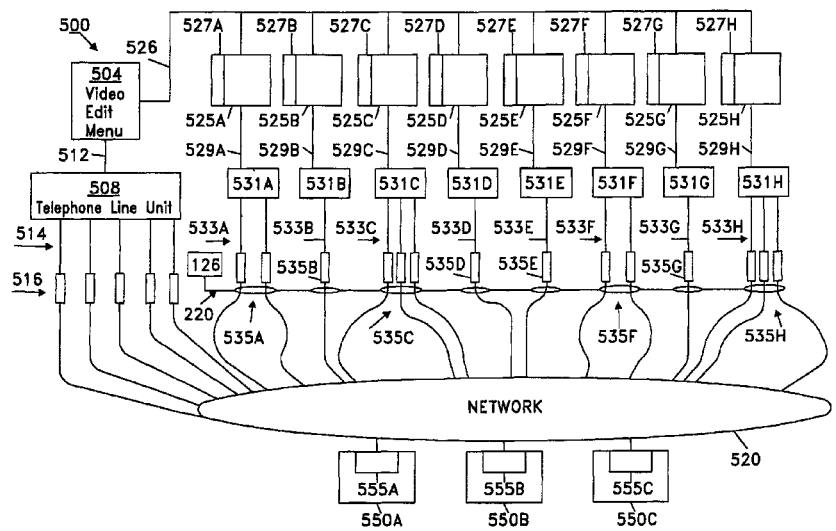

U.S. PATENT DOCUMENTS

| | | | |
|---|---|---|---|
| 4,141,039 A | 2/1979 | Yamamoto | 358/127 |
| 4,336,539 A | 6/1982 | Hendrickson | 343/6 TV |
| 4,484,218 A | 11/1984 | Boland et al. | 358/86 |
| 4,490,726 A | 12/1984 | Weir | 343/840 |
| 4,506,387 A | 3/1985 | Walter | 455/612 |
| 4,538,176 A | 8/1985 | Nakajima et al. | 358/86 |
| 4,630,108 A | 12/1986 | Gomersall | 358/84 |
| 4,672,655 A | 6/1987 | Koch | 379/57 |
| 4,672,656 A | 6/1987 | Pfeiffer et al. | 379/58 |
| 4,734,764 A | 3/1988 | Pocock et al. | 358/86 |
| 4,755,872 A | 7/1988 | Bestler et al. | 358/86 |
| 4,766,581 A | 8/1988 | Korn et al. | 369/30 |
| 4,769,833 A | 9/1988 | Farleigh et al. | 379/105 |
| 4,780,757 A | 10/1988 | Bryer et al. | 358/86 |
| 4,780,758 A | 10/1988 | Lin et al. | 358/86 |
| 4,789,863 A | 12/1988 | Bush | 340/825.35 |
| 4,789,895 A | 12/1988 | Mustafa et al. | 358/147 |
| 4,792,849 A | 12/1988 | McCalley et al. | 358/86 |
| 4,807,282 A | 2/1989 | Kazan et al. | 379/284 |
| 4,816,905 A | 3/1989 | Tweedy et al. | 358/86 |
| 4,829,372 A | 5/1989 | McCalley et al. | 358/86 |
| 4,860,022 A | 8/1989 | Dobroski | 343/840 |
| 4,866,787 A | 9/1989 | Olesen | 455/3 |
| 4,905,094 A | 2/1990 | Pocock et al. | 358/342 |
| 4,912,721 A | 3/1990 | Pidgeon, Jr. et al. | 375/1 |
| 4,916,737 A | 4/1990 | Chomet et al. | 380/20 |
| 4,920,432 A | 4/1990 | Eggers et al. | 360/33.1 |
| 4,937,844 A | 6/1990 | Kao | 375/122 |
| 4,949,187 A | 8/1990 | Cohen | 358/335 |
| 4,963,995 A | 10/1990 | Lang | 358/335 |
| 4,979,170 A | 12/1990 | Gilhousen et al. | 370/104.1 |
| 4,987,486 A | 1/1991 | Johnson et al. | 358/86 |
| 5,014,125 A * | 5/1991 | Pocock et al. | 348/13 |
| 5,019,910 A | 5/1991 | Filmer | 358/188 |
| 5,023,934 A | 6/1991 | Wheeless | 455/45 |
| 5,027,400 A | 6/1991 | Baji et al. | 380/20 |
| 5,029,232 A | 7/1991 | Nall | 455/2 |
| 5,051,822 A | 9/1991 | Rhoades | 358/86 |
| 5,057,932 A | 10/1991 | Lang | 358/335 |
| 5,083,271 A | 1/1992 | Thacher et al. | 364/411 |
| 5,093,718 A | 3/1992 | Hoarty et al. | 358/84 |
| 5,119,188 A | 6/1992 | McCalley et al. | 358/86 |
| 5,130,792 A | 7/1992 | Tindell et al. | 358/85 |
| 5,132,992 A | 7/1992 | Yurt et al. | 375/122 |
| 5,133,079 A | 7/1992 | Ballantyne et al. | 455/4.1 |
| 5,157,491 A | 10/1992 | Kassatly | 358/146 |
| 5,164,839 A | 11/1992 | Lang | 358/335 |
| 5,166,886 A | 11/1992 | Molnar et al. | 364/497 |
| 5,172,413 A | 12/1992 | Bradley et al. | 380/20 |
| 5,181,107 A | 1/1993 | Rhoades | 358/86 |
| 5,191,410 A | 3/1993 | McCalley et al. | 358/86 |
| 5,195,092 A | 3/1993 | Wilson et al. | 370/94.2 |
| 5,198,899 A * | 3/1993 | Cang | 348/7 |
| 5,208,665 A | 5/1993 | McCalley et al. | 358/86 |
| 5,239,540 A | 8/1993 | Rovira et al. | 370/77 |
| 5,247,347 A * | 9/1993 | Litteral et al. | 725/114 |
| 5,247,575 A * | 9/1993 | Sprague et al. | 348/12 |
| 5,249,303 A | 9/1993 | Goeken | 455/33.4 |
| 5,262,875 A | 11/1993 | Mincer et al. | 358/335 |
| 5,276,866 A | 1/1994 | Paolini | 395/600 |
| 5,283,639 A | 2/1994 | Esch et al. | 348/6 |
| 5,291,554 A | 3/1994 | Morales | 380/5 |
| 5,341,474 A * | 8/1994 | Gelman et al. | 725/94 |
| 5,353,337 A | 10/1994 | Tsumura et al. | 379/93 |
| 5,361,091 A | 11/1994 | Hoarty et al. | 348/7 |
| 5,371,532 A | 12/1994 | Gelman et al. | 348/7 |
| 5,390,172 A | 2/1995 | Kuang | 370/60 |
| 5,392,353 A | 2/1995 | Morales | 380/20 |
| 5,410,343 A * | 4/1995 | Coddington et al. | 725/99 |
| 5,412,416 A | 5/1995 | Nemirofsky | 348/10 |
| 5,442,389 A | 8/1995 | Blahut et al. | 348/7 |
| 5,497,479 A | 3/1996 | Hornbuckle | 395/491 |
| 5,508,732 A | 4/1996 | Bottomley et al. | 348/7 |
| 5,539,449 A | 7/1996 | Blahut et al. | 348/7 |
| 5,572,347 A | 11/1996 | Burton et al. | 359/124 |
| 5,663,757 A | 9/1997 | Morales | 348/13 |
| 5,675,575 A | 10/1997 | Wall, Jr. et al. | 370/326 |

OTHER PUBLICATIONS

Gelman, A.D.; Kobrinski, H.; Smoot, L.S.; Weinstein, S.B.; Fortier, M.; and Lemay, D.; "A Store–and–Forward Architecture for Video–on–Demand Service"; IEEE; Jun. 1991; pp. 0842–0846.

Sincoskie, W.D.; "System Architecture for a Large Scale Video on Demand Service"; Computer Networks and ISDN Systems 22 (1991) pp. 155–162.

* cited by examiner

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

The patentability of claims 2-17 and 24-29 is confirmed.

Claims 20-23 are cancelled.

Claims 1, 18 and 19 were not reexamined.

\* \* \* \* \*